United States Patent
Yang et al.

(10) Patent No.: US 12,426,127 B2
(45) Date of Patent: Sep. 23, 2025

(54) CHANNEL AND/OR SIGNAL TRANSCEIVING METHOD AND APPARATUS

(71) Applicant: DATANG MOBILE COMMUNICATIONS EQUIPMENT CO., LTD., Beijing (CN)

(72) Inventors: Meiying Yang, Beijing (CN); Shaohui Sun, Beijing (CN); Jiaqing Wang, Beijing (CN); Fang-Chen Cheng, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 626 days.

(21) Appl. No.: 17/790,601

(22) PCT Filed: Dec. 8, 2020

(86) PCT No.: PCT/CN2020/134700
§ 371 (c)(1),
(2) Date: Jul. 1, 2022

(87) PCT Pub. No.: WO2021/143399
PCT Pub. Date: Jul. 22, 2021

(65) Prior Publication Data
US 2023/0048856 A1    Feb. 16, 2023

(30) Foreign Application Priority Data
Jan. 13, 2020   (CN) .......................... 202010032497.0

(51) Int. Cl.
*H04W 76/28*   (2018.01)
*H04W 52/02*   (2009.01)

(52) U.S. Cl.
CPC ....... *H04W 76/28* (2018.02); *H04W 52/0235* (2013.01)

(58) Field of Classification Search
CPC ....... H04W 4/16; H04W 88/02; H04W 76/10; H04W 76/11; H04W 52/0216;
(Continued)

(56) References Cited

U.S. PATENT DOCUMENTS

| 12,058,648 B2* | 8/2024 | Wang | H04W 4/46 |
| 2015/0156768 A1* | 6/2015 | Guan | H04W 72/21 |
| | | | 370/329 |

(Continued)

FOREIGN PATENT DOCUMENTS

| CN | 109842937 A | 6/2019 |
| CN | 110073716 A | 7/2019 |

(Continued)

OTHER PUBLICATIONS

OPPO, "On Wake-Up Signal Functionalities," 3GPP TSG RAN WG1 Meeting #90bis, R1-1718062, Oct. 13, 2017.
(Continued)

*Primary Examiner* — David Q Nguyen
(74) *Attorney, Agent, or Firm* — Meunier Carlin & Curfman LLC

(57) ABSTRACT

The present application relates to the field of communications, and in particular to a channel and/or signal transceiving method and apparatus. The method comprises: a network side configuring a first channel and/or a first signal, wherein the first channel and/or the first signal are/is used for indicating the receiving and/or sending of a second signal of at least one terminal group corresponding to at least one terminal; and the network side sending the first channel and/or the first signal to the at least one terminal, and the terminal receiving, on the basis of a manner indicated by the network side, the second signal sent by the network side, such that when the terminal is in an RRC-idle or RRC-inactive state, the network side can reduce, in the manner,
(Continued)

the number of times that various types of messages are received by a terminal side.

20 Claims, 3 Drawing Sheets

(58) Field of Classification Search
CPC .. H04W 76/28; H04W 52/0235; Y02D 30/70; H04M 3/42059
USPC .................................. 370/328, 329, 330, 331
See application file for complete search history.

(56) References Cited

U.S. PATENT DOCUMENTS

| | | |
|---|---|---|
| 2018/0332549 A1 | 11/2018 | Bhattad et al. |
| 2019/0350040 A1 | 11/2019 | Liu et al. |
| 2020/0106566 A1* | 4/2020 | Yeo ........................ H04L 1/1854 |
| 2020/0196216 A1 | 6/2020 | Hui et al. |
| 2020/0196242 A1 | 6/2020 | Höglund et al. |
| 2021/0058865 A1 | 2/2021 | Xu |
| 2021/0204216 A1 | 7/2021 | Yang et al. |
| 2021/0235381 A1 | 7/2021 | Yang et al. |
| 2021/0368444 A1 | 11/2021 | Wang et al. |
| 2022/0053597 A1 | 2/2022 | Zhang et al. |
| 2024/0049137 A1* | 2/2024 | Xu ..................... H04W 52/0216 |

FOREIGN PATENT DOCUMENTS

| | | | |
|---|---|---|---|
| CN | 110167107 A | 8/2019 | |
| CN | 110546982 A | 12/2019 | |
| CN | 110557811 A | 12/2019 | |
| CN | 110557812 A | 12/2019 | |
| CN | 110557815 A | 12/2019 | |
| CN | 110831123 A | 2/2020 | |
| CN | 111867016 A | 10/2020 | |
| EP | 3209085 A1 * | 8/2017 | ........ H04M 3/42059 |
| EP | 3846556 A1 * | 7/2021 | ........... H04L 5/0048 |
| WO | 2019063336 A1 | 4/2019 | |
| WO | 2019160496 A1 | 8/2019 | |
| WO | 2019213952 A1 | 11/2019 | |

OTHER PUBLICATIONS

CMCC, "Discussion on power saving signal triggering UE adaptation," 7.2.9.1, 3GPP TSG RAN WG1 #96bis, R1-1904738, Xi'an, China, Apr. 8-12, 2019.

CATT, "PDCCH based power saving signal/channel design," 7.2.9.1, 3GPP TSG RAN WG1 #96bis, R1-1905368, Xi'an, China, Apr. 8-12, 2019.

* cited by examiner

CHANNEL AND/OR SIGNAL TRANSCEIVING METHOD AND APPARATUS

CROSS REFERENCE TO RELATED APPLICATIONS

The present application is a National Stage of International Application No. PCT/CN2020/134700, filed on Dec. 8, 2020, which claims the priority of Chinese Patent Application No. 202010032497.0, filed to the China National Intellectual Property Administration on Jan. 13, 2020.

FIELD

The present application relates to the field of communication, and in particular to a channel and/or signal transceiving method and apparatus.

BACKGROUND

Currently, the transceiving solution for the power saving channel and/or the power saving signal based on the radio resource control-connected (RRC-connected) state is defined in the new radio (NR) R16 standard. The power saving channel and/or the power saving signal are/is used for indicating whether the user equipment (UE) is to be awakened, to be switched to the dormancy state, and optionally, triggers the report of the channel state indicator (CSI) in the next discontinuous reception (DRX) cycle.

However, the current standard does not support the transceiving solution for the power saving channel and/or the power saving signal in the radio resource control-idle (RRC idle) state and the radio resource control-inactive (RRC-inactive) state.

If the transceiving solution for the power saving channel and/or power saving signal in the RRC-connected state is directly applied to RRC-idle and RRC-inactive states, it may be impossible to determine what information that the power saving channel and/or the power saving signal are/is required to bear.

In the RRC-connected state, the power saving channel and/or the power saving signal are/is required to bear the three kinds of information described above at most. However, in the RRC-idle and RRC-inactive states, the paging scene may require the indication. Therefore, if the transceiving manner of the power saving channel and/or the power saving signal is set with reference to the RRC-connected state, the operation load on the terminal side may be increased, thereby bringing unnecessary power consumption to the terminal.

SUMMARY

Embodiments of the present application provide a channel and/or signal transceiving method and apparatus for reducing an operation load on a terminal side.

The embodiments of the present application provide the specific technical solutions as follows.

In the first aspect, provided is a channel and/or signal transceiving method, including: configuring, by a network side, a first channel and/or a first signal, wherein the first channel and/or the first signal are/is used for indicating receiving and/or transmitting of a second signal of at least one terminal group corresponding to at least one terminal; and transmitting, by the network side, the first channel and/or the first signal to the at least one terminal.

Optionally, the first channel is a power saving channel, and the first signal is a power saving signal.

Optionally, the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Optionally, the transmitting, by the network side, the first channel and/or the first signal to the at least one terminal includes: transmitting, by the network side, in a condition that, the network side determines that it needs to transmit the second signal, the first channel and/or the first signal to the at least one terminal.

Optionally, in a condition that the network side determines that it is no need to transmit the second signal, the network side does not transmit the first channel and/or the first signal to the at least one terminal.

Optionally, the at least one terminal is divided into at least one terminal group, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: Z quantity of terminal groups configured corresponding to Z quantity of bits contained in the first channel and/or the first signal, respectively, wherein one bit is used for indicating whether at least one terminal in one terminal group transmits and/or receives the second signal; F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier, or the first channel and/or the first signal contain/contains the Z quantity of bits configured as E-order bits, wherein E is a positive integer greater than 1, first-order bits are used for indicating the quantity of terminal groups for transmitting and/or receiving the second signal, second-order bits are used for indicating a terminal group identifier, and the respective quantities of bits corresponding to the respective terminal groups are the same or different; wherein configurations of the Z quantity of bits are continuous or incontinuous in a resource.

Optionally, the kind of terminal group based on the resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on the parameter configuration of the first channel and/or the first signal includes at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO; a kind of terminal group based on at least one search space (SS) configuration of the first channel and/or the first signal, wherein different SS configurations correspond to different terminal groups, and one SS configuration contains at least one SS; a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one kind of the following joint indications: different joint manners between the bit and the resource configuration of the first channel and/or the first signal correspond to different terminal groups, respectively; different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner; a radio resource control (RRC)-connected signaling configured manner; a media access control-control element (MAC-CE) configured manner; or a dynamic signaling configured manner.

In the second aspect, provided is a channel and/or signal transceiving method, including: receiving, by a terminal, a first channel and/or a first signal transmitted by a network side, wherein the first channel and/or the first signal are/is used for indicating receiving and/or transmitting of a second signal of at least one terminal group corresponding to at least one terminal; and receiving, by the terminal on the basis of indications/an indication of the first channel and/or the first signal, the second signal transmitted by the network side.

Optionally, the first channel is a power saving channel, and the first signal is a power saving signal.

Optionally, the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Optionally, the method further includes: in a condition that the terminal does not receive the first channel and/or the first signal transmitted by the network side, the terminal does not receive the second signal transmitted by the network side.

Optionally, the at least one terminal is divided into at least one terminal group, and the at least one terminal group includes at least one kind of terminal group or at least two kinds of terminal groups indicated jointly of the following a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: Z quantity of terminal groups configured corresponding to Z quantity of bits contained in the first channel and/or the first signal, respectively, wherein one bit is used for indicating whether at least one terminal in one terminal group transmits and/or receives the second signal; F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier; or the first channel and/or the first signal contain/contains the Z quantity of bits configured as E-order bits, wherein E is a positive integer greater than 1, first-order bits are used for indicating the quantity of terminal groups for transmitting and/or receiving the second signal, second-order bits are used for indicating a terminal group identifier, and the respective quantities of bits corresponding to the respective terminal groups are the same or different; wherein configurations of the Z quantity of bits are continuous or incontinuous in a resource.

Optionally, the kind of terminal group based on the resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on the parameter configuration of the first channel and/or the first signal includes at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO; a kind of terminal group based on at least one search space (SS) configuration of the first channel and/or the first signal, wherein different SS configurations correspond to different terminal groups, and one SS configuration contains at least one SS; a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one kind of the following joint indications: different joint manners between the bit and the resource configuration of the first channel and/or the first signal correspond to different terminal groups, respectively; different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner; a radio resource control (RRC)-connected signaling configured manner; a media access control-control element (MAC-CE) configured manner, or a dynamic signaling configured manner.

In the third aspect, provided is a network side apparatus, at least including a processor and a memory, wherein the processor is configured for reading a program in the memory and executing the following processes: configuring a first channel and/or a first signal, wherein the first channel and/or the first signal are/is used for indicating receiving and/or transmitting of a second signal of at least one terminal group corresponding to at least one terminal; and transmitting the first channel and/or the first signal to the at least one terminal.

Optionally, the first channel is a power saving channel, and the first signal is a power saving signal.

Optionally, the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Optionally, when transmitting the first channel and/or the first signal to the at least one terminal, the processor is configured for: transmitting, by the network side, in a condition that the network side determines that it needs to transmit the second signal, the first channel and/or the first signal to the at least one terminal.

Optionally, the processor is further configured for: not transmitting, in a condition that the network side determines that it is no need to transmit the second signal, the first channel and/or the first signal to the at least one terminal.

Optionally, the at least one terminal is divided into at least one terminal group, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: Z quantity of terminal groups configured corresponding to Z quantity of bits contained in the first channel and/or the first signal, respectively, wherein one bit is used for indicating whether at least one terminal in one terminal group transmits and/or receives the second signal; F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier; or the first channel and/or the first signal contain/contains the Z quantity of bits configured as E-order bits, wherein E is a positive integer greater than 1, first-order bits are used for indicating the quantity of terminal groups for transmitting and/or receiving the second signal, second-order bits are used for indicating a terminal group identifier, and the respective quantities of bits corresponding to the respective terminal groups are the same or different; wherein configurations of the Z quantity of bits are continuous or incontinuous in a resource.

Optionally, the kind of terminal group based on the resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on the parameter configuration of the first channel and/or the first signal includes at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO; a kind of terminal group based on at least one search space (SS) configuration of the first channel and/or the first signal, wherein different SS configurations correspond to different terminal groups, and one SS configuration contains at least one SS; a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one of the kind following joint indications: different joint manners between the bit and the resource configuration of the first channel and/or the first signal correspond to different terminal groups, respectively; different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner; a radio resource control (RRC)-connected signaling configured manner; a media access control-control element (MAC-CE) configured manner, or a dynamic signaling configured manner.

In the fourth aspect, provided is a terminal, at least including a processor and a memory, wherein the processor is configured for reading a program in the memory and executing the following processes: receiving a first channel and/or a first signal transmitted by a network side, wherein the first channel and/or the first signal are/is used for indicating receiving and/or transmitting of a second signal of at least one terminal group corresponding to at least one terminal; and receiving, on the basis of indications/an indication of the first channel and/or the first signal, the second signal transmitted by the network side.

Optionally, the first channel is a power saving channel, and the first signal is a power saving signal.

Optionally, the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1–P).

Optionally, the processor is further configured for: not receiving, if the first channel and/or the first signal transmitted by the network side are/is not received, the second signal transmitted by the network side.

Optionally, the at least one terminal is divided into at least one terminal group, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: Z quantity of terminal groups configured corresponding to Z quantity of bits contained in the first channel and/or the first signal, respectively, wherein one bit is used for indicating whether at least one terminal in one terminal group transmits and/or receives the second signal; F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier, or the first channel and/or the first signal contain/contains the Z quantity of bits configured as E-order bits, wherein E is a positive integer greater than 1, first-order bits are used for indicating the quantity of terminal groups for transmitting and/or receiving the second signal, second-order bits are used for indicating a terminal group identifier, and the respective quantities of bits corresponding to the respective terminal groups are the same or different. Configurations of the Z quantity of bits are continuous or incontinuous in a resource.

Optionally, the kind of terminal group based on the resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on the parameter configuration of the first channel and/or the first signal includes at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO; a kind of terminal group based on at least one search space (SS) configuration of the first channel and/or the first signal, wherein different SS configurations correspond to different terminal groups, and one SS configuration contains at least one SS; a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one kind of the following joint indications: different joint manners between the bit and the resource configuration of the first channel and/or the first signal correspond to different terminal groups, respectively; different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner; a radio resource control (RRC)-connected signaling configured manner; a media access control-control element (MAC-CE) configured manner, or a dynamic signaling configured manner.

In the fifth aspect, provided is a network side apparatus, including: a configuration unit for configuring a first channel and/or a first signal, wherein the first channel and/or the first signal are/is used for indicating receiving and/or transmitting of a second signal of at least one terminal group corresponding to at least one terminal; and a communication unit for transmitting the first channel and/or the first signal to the at least one terminal.

In the sixth aspect, provided is a terminal, including: a first communication unit for receiving a first channel and/or a first signal transmitted by a network side, wherein the first channel and/or the first signal are/is used for indicating receiving and/or transmitting of a second signal of at least one terminal group corresponding to at least one terminal; and a second communication unit for receiving, on the basis of indications/an indication of the first channel and/or the first signal, the second signal transmitted by the network side.

In the seventh aspect, provided is a storage medium. When an instruction in the storage medium is executed by a processor, the instruction causes the processor to execute the method according to any one in the first aspect described above.

In the eighth aspect, provided is a storage medium. When an instruction in the storage medium is executed by a processor, the instruction causes the processor to execute the method according to any one in the second aspect described above.

In the embodiments of the present application, the network side configures the first channel and/or the first signal, wherein the first channel and/or the first signal are/is used for indicating receiving and/or transmitting of the second signal of at least one terminal group corresponding to at least one terminal, and the network side transmits the first channel and/or the first signal to the at least one terminal. The terminal receives on the basis of a manner indicated by the network side, the second signal transmitted by the network side, such that when the terminal is in a RRC-idle state or a RRC-inactive state, the network side may reduce, in the manner described above, the quantity of times that various types of messages are received by the terminal side, thereby effectively reducing power consumption of the terminal, and preventing the terminal from being given an unnecessary operation load.

DETAILED DESCRIPTION OF THE EMBODIMENTS

To reduce an operation load on a terminal side, in the embodiments of the present application, when a terminal is in a RRC-idle state or a RRC-inactive state, the network side may not be informed of a current operation state of the terminal. In this case, a power saving channel and/or a power saving signal are/is automatically used for transmitting a related instruction to the terminal.

The preferred implementations of the present application will be described in further detail below with reference to the accompanying drawings.

Figure 1:
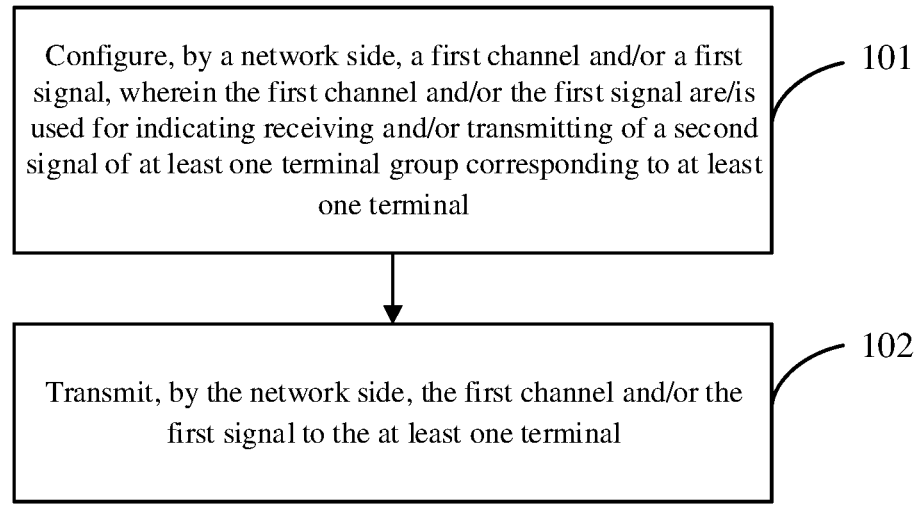
FIG. 1 is a flow chart of a transceiving manner for configuring a power saving channel and/or a power saving signal by a network side in an embodiment of the present application.

As shown in FIG. 1, in an embodiment of the present application, a transceiving process for configuring, by a network side, a power saving channel and/or a power saving signal is as follows.

Step 101: the first channel and/or the first signal are/is configured by the network side, wherein the first channel and/or the first signal are/is used for indicating receiving and/or transmitting of a second signal of at least one terminal group corresponding to at least one terminal.

Optionally, the first channel is a power saving channel, and the first signal is a power saving signal.

The power saving signal is dynamic signaling, static signaling, or semi-static signaling.

Optionally, the second signal is at least one of the following signals: a paging signal; a synchronization signal block (SSB); a channel state indicator-reference signal (CSI-RS); a tracking reference signal (TRS); a phase tracking reference signal (PT-RS); a positioning reference signal (P-RS); or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Further, the first information may also be used for implementing at least one of the following operations: indicating X quantity of radio resource management (RRM) measurements which are based on the second signal; indicating to skip Y quantity of RRM measurements which are based on the second signal; indicating an RRM measurement, which is based on the second signal, in R1 quantity of DRX cycles; Indicating an RRM measurement, which is based on the second signal, in R2 quantity of second signal cycles; indicating to skip an RRM measurement, which is based on the second signal, in S1 quantity of DRX cycles; or indicating to skip an RRM measurement, which is based on the second signal, in S2 quantity of second signal cycles.

Step 102: the network side transmits the first channel and/or the first signal to the at least one terminal.

Specifically, when the network side determines that it needs to transmit the second signal, the network side transmits the first channel and/or the first signal to the at least one terminal.

When the network side determines that it is no need to transmit the second signal, the network side does not transmit the first channel and/or the first signal to the at least one terminal.

Further, after the network side transmits the first channel and/or the first signal to the at least one terminal, the network side transmits, on the basis of indications/an indication of the first channel and/or the first signal, the second signal at the corresponding time point.

On the basis of the embodiment described above, the at least one terminal is divided into at least one terminal group, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: F quantity of terminal groups configured corresponding to Z quantity of bits contained in the first channel and/or the first signal, respectively, wherein F is a positive integer not greater than the Z. and a bit corresponding to each of the terminal groups carries at least one kind of the following information: whether to transmit and/or receive the second signal, or a terminal group identifier; or the first channel and/or the first signal contain/contains the Z quantity of bits configured as E-order bits, wherein E is a positive integer greater than 1, first-order bits are used for indicating the quantity of terminal groups for transmitting and/or receiving the second signal, second-order bits are used for indicating a terminal group identifier, and the respective quantities of bits corresponding to the respective terminal groups are the same or different.

Configurations of the Z quantity of bits are continuous or incontinuous in a resource.

Optionally, the kind of terminal group based on resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on a parameter configuration of the first channel and/or the first signal include at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO; a kind of terminal group based on at least one search space (SS) configuration of the first channel and/or the first signal, wherein different SS configurations correspond to different terminal groups, and one SS configuration contains at least one SS; a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one kind of the following joint indications: different joint manners between the bit and the resource configuration of the first channel and/or the first signal correspond to different terminal groups, respectively; different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner; a radio resource control (RRC)-connected signaling configured manner; a media access control-control element (MAC-CE) configured manner, or a dynamic signaling configured manner.

Figure 2:
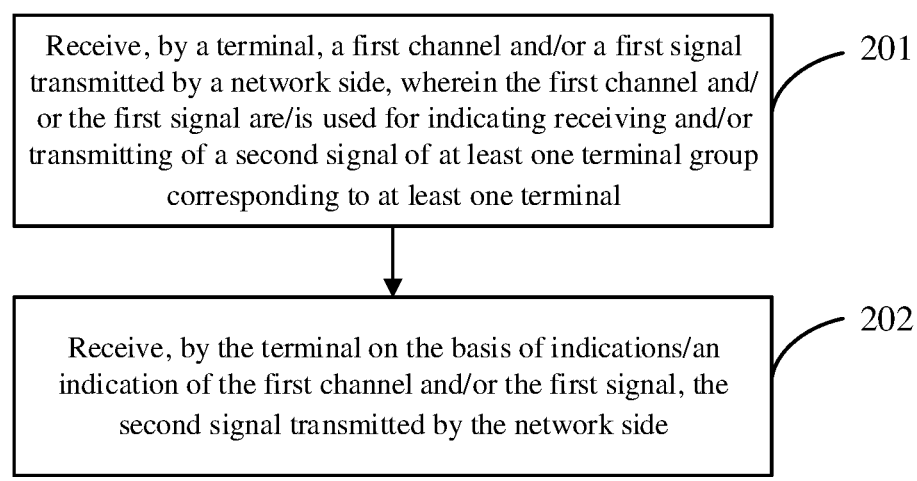
FIG. 2 shows receiving, by a terminal side on the basis of a configuration of a network side, of a power saving channel and/or a power saving signal in an embodiment of the present application.

As shown in FIG. 2, in an embodiment of the present application, a process of receiving, by a terminal on the basis of a power saving channel and/or a power saving signal configured by a network side, a second signal is as follows.

Step 201: the terminal receives the first channel and/or the first signal transmitted by the network side, wherein the first channel and/or the first signal are/is used for indicating receiving and/or transmitting of a second signal of at least one terminal group corresponding to at least one terminal.

Optionally, the first channel is a power saving channel, and the first signal is a power saving signal.

The power saving signal is dynamic signaling, static signaling, or semi-static signaling.

Optionally, the second signal is at least one of the following signals: a paging signal, an SSB, a CSI-RS, a TRS, a PT-RS, a P-RS, or an SRS.

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals: indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Further, the first information may also be used for implementing at least one of the following operations: indicating X quantity of RRM measurements which are based on the second signal; indicating to skip Y quantity of RRM measurements which are based on the second signal; indicating an RRM measurement, which is based on the second signal, in R1 quantity of DRX cycles; Indicating an RRM measurement, which is based on the second signal, in R2 quantity of second signal cycles; indicating to skip an RRM measurement, which is based on the second signal, in S1 quantity of DRX cycles; or indicating to skip an RRM measurement, which is based on the second signal, in S2 quantity of second signal cycles.

Step 202: the terminal receives, on the basis of indications/an indication of the first channel and/or the first signal, the second signal transmitted by the network side.

Further, in a condition that the terminal does not receive the first channel and/or the first signal transmitted by the network side, the terminal does not receive the second signal transmitted by the network side by default.

In the embodiment described above, further, after the network side transmits the first channel and/or the first signal to the at least one terminal, the network side transmits, on the basis of the indications/the indication of the first channel and/or the first signal, the second signal at a corresponding time point.

On the basis of the embodiment described above, the at least one terminal is divided into at least one terminal group, different terminals are divided to different terminal groups, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

In the embodiment of the present application, in the process executed by the terminal side, specifically, reference is made to the related description on the network side in steps 201-202 for configuration manners/a configuration manner of the first channel and/or the first signal, transceiving manners/a transceiving manner of the first channel and/or the first signal, and configuration manners/a configuration manner of the terminal groups, which will not be described in detail herein.

Each embodiment described above is further described in detail below with reference to specific application scenes.

Application scene 1: a network side configures a first channel and/or a first signal for indicating receiving and/or transmitting of a second signal, wherein the first channel and/or the first signal carry/carries first information.

Step A1: the network side configures the first channel and/or the first signal, wherein the first channel and/or the first signal are/is used for indicating receiving and/or transmitting of a second signal of at least one terminal group corresponding to at least one terminal.

Optionally, the first channel may be a power saving channel for transmitting a power saving signal. In a condition that the first channel is the power saving channel, the first channel may be a physical layer channel, an RRC channel, or a high-layer channel.

The first signal may be a power saving signal, and the power saving signal may be dynamic signaling, static signaling, or semi-static signaling.

In a condition that the first signal is the dynamic signaling, the first signal may be physical layer signaling, or a media access control address-control element (MAC-CE).

In a condition that the first signal is the static signaling or the semi-static signaling, the first signal may be MAC-CE, high-layer signaling, or RRC signaling.

The power saving signal may be based on a downlink control information (DCI) format, or a sequence format.

The DCI format may be based on NR R16 and include at least one of the following: DCI format 0-0, DCI format 0-1, DCI format 1-0, DCI format 1-1, DCI format 2-0, DCI format 2-1, DCI format 2-2, DCI format 2-3, DCI format 2-4, DCI format 2-5, DCI format 2-6. DCI format 3-0, or other DCI formats introduced up to the stage R16, which is not limited in the embodiments of the present application.

In the case that the power saving signal is based on the sequence format, a sequence may be a pseudorandom sequence or a low peak to average power ratio (PAPR) sequence, for example, a Zadoff-Chu sequence (that is, a ZC sequence), a Gold sequence, an M sequence, a Hardmard/Wash sequence, or a Kasami sequence, etc., which is not limited in the embodiments of the present application.

The high-layer signaling may be based on a MAC-CE, or based on RRC signaling.

The second signal is at least one of the following signals: a paging signal, an SSB, a CSI-RS, a TRS, a PT-RS, a P-RS, or an SRS. The paging signal may include DCI in at least one MO and further include DCI in at least one slot.

The SSB is used for at least one of the following operations: synchronization and an RRM measurement.

The CSI-RS is used for at least one of the following operations: channel state acquisition (including a local cell and/or a neighbor cell), channel tracking, an RRM measurement, and a mobility measurement.

The TRS is used for at least one of the following operations: channel state acquisition, channel tracking, and an RRM measurement.

The PT-RS is used for the following operation: phase tracking.

The P-RS is used for the following operation: positioning.

The SRS is used for the following operation: channel state acquisition.

Certainly, the above description is merely exemplary, and various types of signals described above may also be used for other operations, which is not limited herein.

Further, in step A1, the first channel and/or the first signal carry/carries the first information, and the first information is used for indicating receiving and/or transmitting of the second signal of the at least one terminal and is used for implementing at least one of the following operations.

1) Indicating Receiving and/or Transmitting of N Quantity of Second Signals.

Specifically, the network side may configure receiving and/or transmitting of N quantity of second signals by using the first information, wherein N is a positive integer greater than or equal to 0, and the first information may be configured with different values of N.

Alternatively, the network side may use the first channel and/or the first signal to trigger receiving and/or transmitting of N quantity of second signals, wherein the N is a positive integer greater than or equal to 0 and may be configured by static signaling/semi-static signaling, RRC signaling, a MAC-CE, high-layer signaling, or dynamic signaling.

In another aspect, the at least one terminal described above may correspond one-to-one, one-to-many, or many-to-many to the N quantity of second signals. The quantity of the terminals may be the same or different from as that of the N quantity of second signals. In subsequent operations 2)-14), reference is made to the above description for correspondence relations between various configuration parameters and the at least one terminal, which will not be described in detail.

2) Indicating Receiving and/or Transmitting of the Second Signal in M1 Quantity of Discontinuous Reception (DRX) Cycles.

Specifically, the network side may configure receiving and/or transmitting of the second signal in the M1 quantity of DRX cycles by using first information, wherein M1 is a positive integer greater than or equal to 0, and for different terminals or different terminal groups, the first information may be configured with different values of M1.

One DRX cycle may include at least one second signal, and the quantity of second signals included in each DRX cycle may be different or the same.

Specifically, a first DRX cycle configuration includes A quantity of first second signals, and a second DRX cycle configuration includes B quantity of first second signals. A and B are both positive integers greater than or equal to 0, and A is not equal to B. A third DRX cycle configuration includes A quantity of first second signals and C quantity of second second signals, and a fourth DRX cycle configuration includes A quantity of first second signals and D quantity of second second signals. The first second signals and the second second signals are different second signals.

In another aspect, the network side may also use a first channel and/or a first signal to trigger receiving and/or transmitting of the second signal in the M1 quantity of DRX cycles, wherein the M1 is a positive integer greater than or equal to 0 and may be configured by static signaling, semi-static signaling, RRC signaling, a MAC-CE, high-layer signaling, or dynamic signaling.

3) Indicating Receiving and/or Transmitting of the Second Signal in M2 Quantity of Second Signal Cycles.

Specifically, the network side may configure receiving and/or transmitting of the second signal in the M2 quantity of second signal cycles by using first information. M2 is a positive integer greater than or equal to 0, and for different terminals or different terminal groups, the first information may be configured with different values of M2.

The one second signal cycle may include at least one second signal, and the quantity of second signals included in each of the second signal cycles may be different or the same.

In another aspect, the network side may also use a first channel and/or a first signal to trigger receiving and/or transmitting of the second signal in the M2 quantity of second signal cycles, wherein the M2 is a positive integer greater than or equal to 0 and may be configured by static signaling, semi-static signaling, RRC signaling, a MAC-CE, high-layer signaling, or dynamic signaling.

4) Indicating to Skip Receiving and/or Transmitting of K Quantity of Second Signals.

Specifically, the network side may configure to skip receiving and/or transmitting of the K quantity of second signals by using first information, wherein K is a positive integer greater than or equal to 0, and the first information may be configured with different values of K.

In another aspect, the network side may also indicate to trigger to skip receiving and/or transmitting of the K quantity of second signals by using first information, wherein the K is a positive integer greater than or equal to 0 and may be configured by static signaling, semi-static signaling, RRC signaling, a MAC-CE, high-layer signaling, or dynamic signaling.

5) Indicating to Skip Receiving and/or Transmitting of the Second Signal in L1 Quantity of DRX Cycles.

Specifically, the network side may configure to skip receiving and/or transmitting of the second signal in the L1 quantity of DRX cycles by using first information, wherein the L1 is a positive integer greater than or equal to 0, and for different terminals or different terminal groups, the first information be configured with different values of L.

One DRX cycle may include at least one second signal, and the quantity of second signals included in each of the DRX cycles may be different or the same.

Specifically, a first DRX cycle configuration includes AA quantity of first second signals, and a second DRX cycle configuration includes BB quantity of first second signals. AA and BB are both positive integers greater than or equal to 0, and AA is not equal to BB. A third DRX cycle configuration includes AA quantity of first second signals and CC quantity of second second signals, and a fourth DRX cycle configuration includes AA quantity of first second signals and DD quantity of second second signals. The first second signals and the second second signals are different second signals.

In another aspect, the network side may also use a first channel and/or a first signal to trigger receiving and/or transmitting of the second signal in the L1 quantity of DRX cycles, wherein the L1 is a positive integer greater than or equal to 0 and may be configured by static signaling, semi-static signaling, RRC signaling, a MAC-CE, high-layer signaling, or dynamic signaling.

6) Indicating to Skip Receiving and/or Transmitting of the Second Signal in L2 Quantity of Second Signal Cycles.

Specifically, the network side may configure to skip receiving and/or transmitting of the second signal in the L2 quantity of second signal cycles by using first information, wherein the L2 is a positive integer greater than or equal to 0, and for different terminals or different terminal groups, the first information may be configured with different values of L2.

One second signal cycle may include at least one second signal, and the respective quantities of second signals included in the respective second signal cycles may be different or the same.

In another aspect, the network side may also use a first channel and/or a first signal to trigger receiving and/or transmitting of the second signal in the L2 quantity of second signal cycles, wherein the L2 is a positive integer greater than or equal to 0 and may be configured by static signaling, semi-static signaling, RRC signaling, a MAC-CE, high-layer signaling, or dynamic signaling.

7) Indicating Receiving and/or Transmitting of the Second Signal(s) with a Probability P.

Specifically, the network side may indicate receiving and/or transmitting of the second signal with the probability P by using first information, wherein P is a positive real number greater than or equal to 0 and less than or equal to 1.

The first information may indicate a value of P or an index value corresponding to the value of P. The value of P and/or the index value corresponding to the value of P may be configured by high-layer signaling, a MAC-CE, or RRC signaling.

In another aspect, the network side may also indicate to trigger receiving and/or transmitting of the second signal with the probability P by using first information, wherein the related description on the probability P is the same as above.

8) Indicating to Skip Receiving and/or Transmitting of the Second Signal(s) with a Probability Q or (1−P).

Specifically, the network side may indicate to skip receiving and/or transmitting of the second signal with the probability Q or (1−P) by using first information, wherein the probability Q or (1−P) is a positive real number greater than or equal to 0 and less than or equal to 1.

The first information may indicate a value of Q or (1−P) or an index value of Q or (1−P). The Q or (1−P), and/or the index value corresponding to Q or (1−P) may be configured by high-layer signaling, a MAC-CE, or RRC signaling.

In another aspect, the network side may also indicate to trigger to skip receiving and/or transmitting of the second signal with the probability Q or (1−P) by using first information, wherein the related description on the probability Q or (1−P) is the same as above.

9) Indicating X Quantity of RRM Measurements which are Based on the Second Signal.

Specifically, the network side may configure the X quantity of RRM measurements which are based on the second signal by using first information. The X may be a positive integer greater than or equal to 0, wherein the X may contain X quantity of intra-frequency and/or inter-frequency RRM measurements, or RRM measurements over X quantity of time units, and the time unit may be a sub-frame, a slot, a symbol, or a time window, etc. The RRM measurements may be at least one of the following: including X quantity of measurement cycles, containing X quantity of measurement sample points, or containing X quantity of reports.

In another aspect, the network side may also indicate to trigger X quantity of RRM measurements which are based on the second signal by using first information, wherein the X is a positive integer greater than or equal to 0 and may be configured by static signaling, semi-static signaling, RRC signaling, a MAC-CE, high-layer signaling, or dynamic signaling.

10) Indicating to Skip Y Quantity of RRM Measurements which are Based on the Second Signal.

Specifically, the network side may configure to skip the Y quantity of RRM measurements which are based on the second signal by using first information. The Y may be a positive integer greater than or equal to 0, wherein the Y may include Y quantity of intra-frequency or inter-frequency RRM measurements or RRM measurements over Y quantity of time units, and the time unit may be a sub-frame, a slot, a symbol, or a time window, etc.

In another aspect, the network side may also indicate to trigger to skip the Y quantity of RRM measurements which are based on the second signal by using first information, wherein the Y is a positive integer greater than or equal to 0 and may be configured by static signaling, semi-static signaling, RRC signaling, a MAC-CE, high-layer signaling, or dynamic signaling.

11) Indicating an RRM Measurement, which is Based on the Second Signal, in R1 Quantity of DRX Cycles.

Specifically, the network side may configure the RRM measurement, which is based on the second signal, in the R1 quantity of DRX cycles by using first information. The R1 may be a positive integer greater than or equal to 0.

Each of the R1 quantity of DRX cycles may contain at least one intra-frequency and/or inter-frequency RRM measurement or an RRM measurement over at least one time unit, wherein the time unit may be a sub-frame, a slot, a symbol, a time window, etc.

In another aspect, the network side may also indicate to trigger of the RRM measurement, which is based on the second signal, in the R1 quantity of DRX cycles by using first information, wherein the R1 is a positive integer greater than or equal to 0 and may be configured by static signaling, semi-static signaling, RRC signaling, a MAC-CE, high-layer signaling, or dynamic signaling.

12) Indicating an RRM Measurement, which is Based on the Second Signal, in R2 Quantity of Second Signal Cycles.

Specifically, the network side may configure the RRM measurement, which is based on the second signal, in the R2 quantity of second signal cycles by using first information. The R2 may be a positive integer greater than or equal to 0.

One second signal cycle may include at least one second signal, and the respective quantities of second signals included in the respective second signal cycles may be different or the same.

In another aspect, the network side may also use a first channel and/or a first signal to trigger receiving and/or transmitting of the second signal in the R2 quantity of second signal cycles, wherein the R2 is a positive integer greater than or equal to 0 and may be configured by static signaling, semi-static signaling, RRC signaling, a MAC-CE, high-layer signaling, or dynamic signaling.

13) INDICATING TO SKIP AN RRM MEASUREMENT, WHICH IS BASED ON THE SECOND SIGNAL, IN S1 QUANTITY OF DRX CYCLES.

Specifically, the network side may indicate to skip the RRM measurement, which is based on the second signal, in the S1 quantity of DRX cycles by using first information. The S1 may be a positive integer greater than or equal to 0.

Each of the S1 quantity of DRX cycles may contain at least one intra-frequency and/or inter-frequency RRM measurement or an RRM measurement over at least one time unit, wherein the time unit may be a sub-frame, a slot, a symbol, a time window, etc.

In another aspect, the network side may also indicate to trigger to skip the RRM measurement, which is based on the second signal, in S1 quantity of DRX cycles by using first information, wherein the S1 is a positive integer greater than or equal to 0 and may be configured by static signaling, semi-static signaling, RRC signaling, a MAC-CE, high-layer signaling, or dynamic signaling.

14) Indicating to Skip an RRM Measurement, which is Based on the Second Signal, in S2 Quantity of Second Signal Cycles.

Specifically, the network side may indicate to skip the RRM measurement, which is based on the second signal, in the S2 quantity of second signal cycles by using first information. The S2 may be a positive integer greater than or equal to 0.

Each of the S2 quantity of second signal cycles may contain at least one intra-frequency and/or inter-frequency RRM measurement or an RRM measurement over at least one time unit, wherein the time unit may be a sub-frame, a slot, a symbol, a time window, etc.

In another aspect, the network side may also indicate to trigger to skip the RRM measurement, which is based on the second signal, in the S2 quantity of second signal cycles by using first information, wherein the S2 is a positive integer greater than or equal to 0 and may be configured by static signaling, semi-static signaling, RRC signaling, a MAC-CE, high-layer signaling, or dynamic signaling.

Step A2: the network side transmits the first channel and/or the first signal to the at least one terminal.

In the embodiment of the present application, it is assumed that the network side transmits the first channel and/or the first signal at a first time point, and the first time point is not later than a transmitting time point of the second signal.

Specifically, the first time point may be before a DRX-active time point, may be the DRX-active time point, may be before a receiving and/or transmitting time point of the second signal, and may be the receiving and/or transmitting time point of the second signal.

The first time point may be configured by static signaling, semi-static signaling, RRC signaling, a MAC-CE, high-layer signaling, or dynamic signaling.

Step A3: the network side transmits, on the basis of indications/an indication of the first channel and/or the first signal, the second signal to the at least one terminal.

Specifically, the network side transmits, according to the indications/the indication of the first channel and/or the first signal, the second signal at a second time point, wherein the second time point may be configured by static signaling, semi-static signaling, RRC signaling, a MAC-CE, high-layer signaling, or dynamic signaling.

Based on steps A1-A3 described above, correspondingly, the terminal may also receive, on the basis of the indications/the indication of the first channel and/or the first signal, the second signal transmitted by the network side, wherein reference is made to the related description on the network side for each of specific configuration manners/a specific configuration manner of the first channel and/or the first signal, a configuration manner of a receiving time point of the first signal, and a configuration manner of a receiving time point of the second signal, which will not be described in detail herein.

Correspondingly, the terminal side receives the first information configured by the network side for indicating receiving and/or transmitting of the second signal, wherein the first channel and/or the first signal carry/carries the first information.

Application scene 2: a network side configures a first channel and/or a first signal, for indicating receiving and/or transmitting of a second signal, wherein the first signal is merely used for indicating whether to awaken a terminal. Alternatively, the network side does not transmit the first signal, for indicating dormancy of the terminal.

Step B1: the network side configures the first channel and/or the first signal, wherein the first channel and/or the first signal are/is used for indicating whether to awaken at least one terminal to receive and/or transmit a second signal.

Optionally, the first channel may be a power saving channel. In a condition that the first channel is the power saving channel, the first channel may be a physical layer channel, an RRC channel, or a high-layer channel.

The first signal may be a power saving signal, and the power saving signal may be dynamic signaling, static signaling, or semi-static signaling.

In a condition that the first channel is the dynamic signaling, the first signal may be physical layer signaling or a MAC-CE.

In a condition that the first channel is the static signaling or the semi-static signaling, the first signal may be a MAC-CE, high-layer signaling, or RRC signaling.

The power saving signal may be based on a downlink control information (DCI) format, or a sequence format.

The DCI format may be based on NR R16 and include at least one of the following: DCI format 0-0, DCI format 0-1, DCI format 1-0, DCI format 1-1, DCI format 2-0, DCI format 2-1, DCI format 2-2, DCI format 2-3, DCI format 2-4, DCI format 2-5, DCI format 2-6, DCI format 3-0, or other DCI formats introduced up to the stage R16, which is not limited in the embodiment of the present application.

In the case that the power saving signal is based on the sequence format, a sequence may be a pseudorandom sequence or a low peak to average power ratio (PAPR) sequence, for example, a ZC sequence, a Gold sequence, an M sequence, a Hardmard/Wash sequence, or a Kasami sequence, etc., which is not limited in the embodiment of the present application.

The high-layer signaling may be based on a MAC-CE, or based on RRC signaling.

The second signal is at least one of the following signals: a paging signal, an SSB, a CSI-RS, a TRS, a PT-RS, a P-RS, or an SRS, wherein the paging signal may include DCI in at least one MO and further include DCI in at least one slot.

The first channel and/or the first signal are/is used for indicating whether to awaken the at least one terminal to receive and/or transmit the second signal, wherein an indication manner may be an explicit indication manner or an implicit indication manner, which are described respectively as follows.

The explicit indication manner described above indicates whether to awaken the at least one terminal and includes: signaling 1 or a bit 1 may be used to indicate awakening of at least one terminal; and signaling 2 or a bit 2 may be used to indicate non-awakening or dormancy of at least one terminal.

The implicit indication manner described above indicates whether to awaken the at least one terminal and includes: the first channel and/or the first signal may be transmitted to indicate awakening of at least one terminal; and the first channel and/or the first signal may not be transmitted to indicate non-awakening or dormancy of at least one terminal or transmitting of the first channel and/or the first signal may be skipped to indicate non-awakening or dormancy of at least one terminal.

The at least one terminal may receive and/or transmit the second signal upon and/or after being awakened.

Further, the first channel and/or the first signal are/is used for indicating awakening of at least one terminal, wherein the first channel and/or the first signal include/includes E quantity of bits (hereinafter referred to as bit) in total, E is a positive integer greater than or equal to 1, and the at least one terminal includes at least one terminal group.

Specifically, at least one of the following solutions may be used.

Solution 1: the first channel and/or the first signal include/ includes E quantity of bits, which are used for indicating whether to awaken E terminal groups, respectively.

Specifically, the E quantity of bits represent the numbers of the terminal groups, respectively, and each of the bits represents awakening, non-awakening, or dormancy of the terminal group.

Configuration information of the terminal groups includes at least one of the following: serial numbers of all terminals in one terminal group, the quantity of the terminal groups, or serial numbers of the terminal groups.

The configuration information of the terminal groups may be configured in at least one of the following manners: a predefined manner, a static signaling configured manner, a semi-static signaling configured manner, a RRC signaling configured manner, a MAC-CE configured manner, a high-layer signaling configured manner, or a dynamic signaling configured manner.

For example, X1 quantity of terminals the serial numbers of which are 1 to X1, respectively, are divided into Y1 quantity of terminal groups the serial numbers of which are 1 to Y1, respectively, and each of the terminal groups includes Z1 quantity of terminals the serial numbers of which are 1 to Z1, respectively.

Optionally, the terminal groups may be divided in a predefined manner. For example, a rule, mod(X1, Y1)=yi, may be defined, that is, the serial number X1 of a terminal is used to carry out a modulus operation on the serial number Y1 of a terminal group. If a remainder is yi, the terminal with the serial number X1 belongs to the terminal group a serial number of which may be yi.

Optionally, the terminal groups may also be divided in an RRC configuration manner, that is, a list may be predefined in an RRC layer, specifically as shown in Table 1A, wherein each row of configuration in Table 1A corresponds to numbers of all terminals in one terminal group, and the quantity of the terminal groups is the same as the quantity of columns of the list.

TABLE 1A (a schematic diagram of terminal groups configured in RRC configuration manner in Solution 1)

| Terminal group | No. 1 | No. 2 | No. 3 | No. 4 | No. 5 | No. . . . | No. Y1 |
|---|---|---|---|---|---|---|---|
| 1 | 1 | 13 | 25 | 37 | . . . | . . . | . . . |
| 2 | 2 | 14 | 26 | 38 | . . . | . . . | . . . |
| 3 | 3 | 15 | 27 | 39 | . . . | . . . | . . . |
| 4 | 4 | 16 | 28 | 40 | . . . | . . . | . . . |
| 5 | 5 | 17 | 29 | 41 | . . . | . . . | . . . |
| 6 | 6 | 18 | 30 | 42 | . . . | . . . | . . . |
| 7 | 7 | 19 | 31 | 43 | . . . | . . . | . . . |
| 8 | 8 | 20 | 32 | 44 | . . . | . . . | . . . |
| 9 | 9 | 21 | 33 | 45 | . . . | . . . | . . . |
| 10 | 10 | 22 | 34 | 46 | . . . | . . . | . . . |
| 11 | 11 | 23 | 35 | 47 | . . . | . . . | . . . |
| 12 | 12 | 24 | 36 | 48 | . . . | . . . | . . . |

The quantity of the terminal groups and the serial numbers of the terminal groups may be configured by at least one of the following manners: static signaling, semi-static signaling, RRC signaling, a MAC-CE, high-layer signaling, and dynamic signaling.

Further, as shown in Table 1B, the terminal groups configured through Solution 1 may be recorded as below.

TABLE 1B (a schematic diagram of terminal groups in Solution 1)

| | Group ID | | | | | | |
|---|---|---|---|---|---|---|---|
| | Group 1 | Group 2 | Group 3 | Group 4 | Group 5 | Group . . . | Group E |
| bit | 1 | 0 | 0 | 0 | 0 | 0 | 1 |
| Whether to awaken | Awakening | Dormancy | Dormancy | Dormancy | Dormancy | Dormancy | Awakening |

Solution 2: the first channel and/or the first signal include/ includes E quantity of bits corresponding to F terminal groups, respectively, wherein first FF quantity of bits corresponding to one terminal group are used for indicating whether to awaken corresponding terminals, and following GG bits corresponding to the one terminal group are used for indicating identifiers (IDs) of the one terminal group, specifically as shown in Table 2. FF and GG described above are positive integers.

Optionally, the FF and the GG may be configured by at least one of the following manners: a predefined manner, a static signaling configured manner, a semi-static signaling configured manner, a RRC signaling configured manner, a MAC-CE configured manner, a high-layer signaling configured manner, or a dynamic signaling configured manner.

TABLE 2

| (a schematic diagram of terminal groups in Solution 2) | | | | | | | | | | |
|---|---|---|---|---|---|---|---|---|---|---|
| | Group No. | | | | | | | | | |
| | Group No. 1 | | | Group No. 2 | | | Group . . . | | Group No. F | |
| bit | 1 | 0 | 0 | 0 | 0 | 1 | 1 | 1 0 | 0 | 1 1 |
| Paraphrase | Awakening | Group 0 | Dormancy | Group 1 | | Awakening | Group 2 | Dormancy | Group 3 | |

In another aspect, F quantity of terminal groups may also be used for representing first-level terminal group information, wherein the first-level terminal group information is used for indicating related information of the terminal groups, specifically as shown in Table 3.

The first-level terminal group information may be configured by static signaling, semi-static signaling, RRC signaling, a MAC-CE, high-layer signaling, or dynamic signaling.

The first-level terminal group information includes at least one of an awakening indicator and second-level terminal group information, wherein the second-level terminal group information may be configured by static signaling, semi-static signaling, RRC signaling, a MAC-CE, high-layer signaling, or dynamic signaling.

TABLE 3

| (a schematic diagram of two-level terminal groups in Solution 2) | | | | | | | | | | |
|---|---|---|---|---|---|---|---|---|---|---|
| | Group ID | | | | | | | | | |
| | Group ID_1 | | | Group ID_2 | | | Group . . . | | Group ID_F | |
| bit | 1 | 0 | 0 | 0 | 0 | 1 | 1 | 1 0 | 0 | 1 1 |
| Paraphrase | Awakening | Sub-group 0 | Dormancy | Sub-group 1 | | Awakening | Sub-group 2 | Dormancy | Sub-group 3 | |

Solution 3: the first channel and/or the first signal are/is divided into N-order information indications, wherein the first-order information indication is used for representing n1 quantity of terminal groups carried in the first channel and/or the first signal, the second-order information indication is used for representing terminal group IDs of the n1 quantity of terminal groups, the third-order information indication is used for representing terminal group IDs of sub-terminal groups in each of the terminal groups, the fourth-order information indication is used for representing terminal group IDs of sub-terminal groups in each of the sub-terminal groups, and so on until the Nth-order information indication.

The N may be configured by at least one of the following manners: a static signaling configured manner, a semi-static signaling configured manner, a RRC signaling configured manner, a MAC-CE configured manner, a high-layer signaling configured manner, or a dynamic signaling configured manner.

The respective quantities of bits carried in the respective terminal group IDs may be the same or different, specifically as shown in Tables 4 and 5.

TABLE 4

| (a schematic diagram 1 of terminal groups in Solution 3) | | | | |
|---|---|---|---|---|
| | Quantity of groups | Group No. 0 | Group No. 1 | Group No. 2 |
| bit | 1 0 | | | |
| Group ID | Three groups in total | Group ID_1 | Group ID_4 | Group ID_3 |

TABLE 5

| (a schematic diagram 2 of terminal groups in Solution 3) | | | | | |
|---|---|---|---|---|---|
| | Quantity of groups | Group No. 0 | Group No. 1 | Group No. 2 | Group No. 3 |
| bit | 1 1 | 0 0 0 | 1 0 0 | 1 1 0 0 | 1 0 |
| Group ID | Four groups in total | Group ID_1 | Group ID_8 | Group ID_12 | Group ID_3 |

Step B2: the network side transmits the first channel and/or the first signal to at least one terminal.

A specific implementation process is the same as step A2 in Application Scene 1, and will not be described in detail.

Step B3: the network side transmits, according to indications/an indication of the first channel and/or the first signal, the second signal to the at least one terminal.

A specific implementation process is the same as step A3 in Application Scene 1, and will not be described in detail.

Based on steps B1-B3 described above, correspondingly, the terminal may also receive, on the basis of the indications/the indication of the first channel and/or the first signal, the second signal transmitted by the network side, wherein reference is made to the related description on the network side for specific configuration manners/a specific configuration manner of the first channel and/or the first signal, a configuration manner of a receiving time point of the first signal, and a configuration manner of a receiving time point of the second signal, which will not be described in detail herein.

Correspondingly, the terminal receives the first channel and/or the first signal configured by the network side for indicating receiving and/or transmitting of the second signal, wherein the first channel and/or the first signal are/is merely used for indicating whether to awaken the terminal. Alternatively, the first channel and/or the first signal are/is merely used for indicating awakening of the terminal. When detecting no first channel and/or first signal, the terminal enters dormancy. Reference may be made to the related description on the network side for the specific description, which will not be described in detail herein.

Application scene 3: a network side configures time, frequency, and spatial resources of a first channel and/or a first signal for indicating receiving and/or transmitting of a second signal.

Step C1: the network side configures the first channel and/or the first signal, wherein the first channel and/or the first signal are/is used for indicating receiving and/or transmitting of the second signal of at least one terminal group corresponding to at least one terminal.

The related description on the first channel and/or the first signal is the same as that in Application Scene 1, and will not be described in detail.

The related description on the second signal is the same as that in Application Scene 1, and will not be described in detail.

Optionally, the receiving and/or transmitting of the second signal of at least one terminal (containing at least one terminal group) may be implemented at the same position, and specifically, different terminals or different terminal groups may be distinguished from one another by being configured with starting positions of different resources.

The resources may include at least one or a combination of at least two of the following three kinds of resources: time domain resources, for example, at least one of a radio frame, a sub-frame, a slot, or a symbol, etc.; frequency domain resources, for example, at least one of a carrier wave, a bandwidth part (BWP), a resource block (RB), or a resource element (RE), etc.; or spatial domain resources, for example, a beam, an antenna, or a spatial layer.

Step C2: the network side transmits the first channel and/or the first signal to at least one terminal.

A specific implementation process is the same as step A2 in Application Scene 1, and will not be described in detail.

Step C3: the network side transmits, according to indications/an indication of the first channel and/or the first signal, the second signal to the at least one terminal.

A specific implementation process is the same as step A3 in Application Scene 1, and will not be described in detail.

Based on steps C1-C3 described above, correspondingly, the terminal may also receive, on the basis of the indications/the indication of the first channel and/or the first signal, the second signal transmitted by the network side, wherein reference is made to the related description on the network side for specific configuration manners/a specific configuration manner of the first channel and/or the first signal, a configuration manner of a receiving time point of the first signal, and a configuration manner of a receiving time point of the second signal, which will not be described in detail herein.

Correspondingly, the terminal receives the first channel and/or the first signal configured by the network side to execute receiving and/or transmitting of the second signal.

Application scene 4: a network side configures different parameter configurations of a first channel and/or a first signal to indicate receiving and/or transmitting of a second signal.

Step D1: the network side configures the first channel and/or the first signal, wherein the first channel and/or the first signal are/is used for indicating receiving and/or transmitting of the second signal of at least one terminal group corresponding to at least one terminal.

The related description on the first channel and/or the first signal is the same as that in Application Scene 1, and will not be described in detail.

The related description on the second signal is the same as that in Application Scene 1, and will not be described in detail.

Optionally, the receiving and/or transmitting of the second signal of at least one terminal (containing at least one terminal group) may be implemented at the same position, and specifically, different terminals or different terminal groups may be distinguished from one another by being configured with different parameter configurations based on types/a type of the first channel and/or the first signal.

Optionally, if a power saving channel is a physical downlink control channel (PDCCH), and/or if a power saving signal is a signal based on the PDCCH, a configuration may be carried out by at least one of the following manners: indicating to distinguish different terminals or different terminal groups by configuring starting positions of different MOs; indicating to distinguish different terminals or different terminal groups by configuring different CORESETs; indicating to distinguish different terminals or different terminal groups by configuring different SSs; indicating to distinguish different terminals or different terminal groups by configuring positions of different SS candidates; or indicating to distinguish different terminals or different terminal groups by configuring different hash function starting positions.

Optionally, if the power saving signal is a reference signal, such as TRS or CSI-RS, etc., slot serial numbers and/or symbol serial numbers, in a time domain, of different reference signals (TRS and/or CSI-RS) may be used for indicating to distinguish different terminals or different terminal groups.

Further, different RBs and/or different BWPs, in a frequency domain, of different reference signals (TRS and/or CSI-RS) may also be used for indicating to distinguish different terminals or different terminal groups.

The configuration manners described above may be implemented in at least one of the following manners: a static signaling configured manner, a semi-static signaling configured manner, a RRC signaling configured manner, a MAC-CE configured manner, a high-layer signaling configured manner, or a dynamic signaling configured manner.

Step D2: the network side transmits the first channel and/or the first signal to at least one terminal.

A specific implementation process is the same as step A2 in Application Scene 1, and will not be described in detail.

Step D3: the network side transmits, according to indications/an indication of the first channel and/or the first signal, the second signal to the at least one terminal.

A specific implementation process is the same as step A3 in Application Scene 1, and will not be described in detail.

Based on steps D1-D3 described above, correspondingly, the terminal may also receive, on the basis of the indications/the indication of the first channel and/or the first signal, the second signal transmitted by the network side, wherein reference is made to the related description on the network side for specific configuration manners/a specific configuration manner of the first channel and/or the first signal, a configuration manner of a receiving time point of the first signal, and a configuration manner of a receiving time point of the second signal, which will not be described in detail herein.

Correspondingly, the terminal receives the first channel and/or the first signal configured by the network side to execute receiving and/or transmitting of the second signal.

Application scene 5: a base station configures a joint indication of at least two kinds of the following information for indicating receiving and/or transmitting of a second signal: bits of a first channel and/or a first signal, different resource configurations of the first channel and/or the first signal, and different parameters of the first channel and/or the first signal.

Step E1: a network side configures the first channel and/or the first signal, wherein the first channel and/or the first signal are/is used for indicating receiving and/or transmitting of the second signal of at least one terminal group corresponding to at least one terminal.

The related description on the first channel and/or the first signal is the same as that in Application Scene 1, and will not be described in detail.

The related description on the second signal is the same as that in Application Scene 1, and will not be described in detail.

Optionally, the receiving and/or transmitting of the second signal of at least one terminal (including at least one terminal group) may be implemented on the same position. Specifically, different terminals or different terminal groups may be distinguished from one another in a joint indication manner by using at least two kinds of the following three kinds of information: the bits of the first channel and/or the first signal, different resource configurations of the first channel and/or the first signal, and different parameter configurations of the first channel and/or the first signal.

Reference is made to the related description in Application scene 2, the related description in Application scene 3, and the related description in Application scene 4, respectively, for a method for distinguishing different terminals or different terminal groups from one another based on bits of s first channel and/or a first signal, a method for distinguishing different terminals or different terminal groups from one another based on different resource configurations of a first channel and/or a first signal, and a method for distinguishing different terminals or different terminal groups from one another based on different parameter configurations of a first channel and/or a first signal, which will not be described in detail herein.

Different resource configurations include at least one of a time domain resource, a frequency domain resource and a spatial domain resource. Types of the first channel and/or the first signal include at least one of a CORESET, an MO, an SS, an SS candidate, different hash function starting positions, etc.

Specifically, for example, a joint indication of the MO and the resource configurations is used. Therefore, the terminal groups may be distinguished from one another on the basis of different resource configurations and different MOs.

For example, an MO of a first slot corresponds to a first terminal group, and an MO of a second slot corresponds to a second terminal group.

Moreover, a first MO corresponds, in the first slot, to the first terminal group, and the first MO corresponds, in the second slot, to the second terminal group.

The configuration manners described above may be implemented in at least one of the following manners: a static signaling configured manner, a semi-static signaling configured manner, a RRC signaling configured manner, a MAC-CE configured manner, a high-layer signaling configured manner, or a dynamic signaling configured manner.

Step E2: the network side transmits the first channel and/or the first signal to at least one terminal.

A specific implementation process is the same as step A2 in Application Scene 1, and will not be described in detail.

Step E3: the network side transmits, according to indications/an indication of the first channel and/or the first signal, the second signal to the at least one terminal.

A specific implementation process is the same as step A3 in Application Scene 1, and will not be described in detail.

Based on steps E1-E3 described above, correspondingly, the terminal may also receive, on the basis of the indications/the indication of the first channel and/or the first signal, the second signal transmitted by the network side, wherein reference is made to the related description on the network side for specific configuration manners/a specific configuration manner of the first channel and/or the first signal, a configuration manner of a receiving time point of the first signal, and a configuration manner of a receiving time point of the second signal, which will not be described in detail herein.

Correspondingly, the terminal receives the joint indication of at least two kinds of the following information configured by the network side for executing receiving and/or transmitting of the second signal: the bits of the first channel and/or the first signal, different resource configurations of the first channel and/or the first signal, and different parameters of the first channel and/or the first signal.

Figure 3:
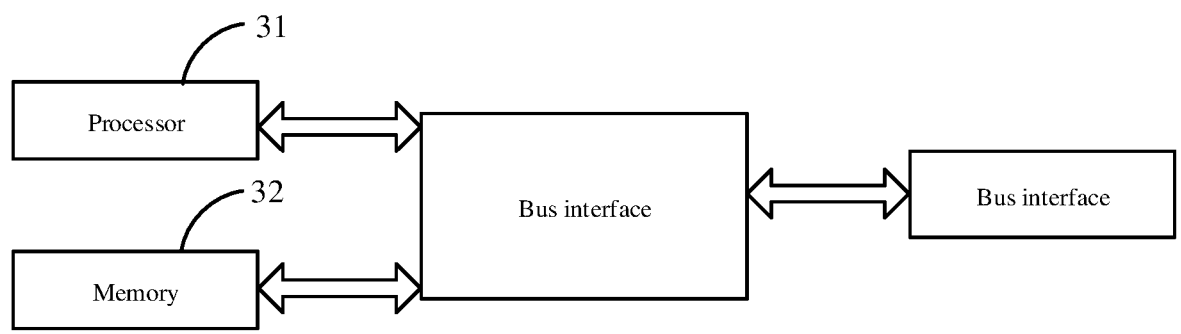
FIG. 3 is a structural schematic diagram of an entity of a network side apparatus in an embodiment of the present application.

Based on the same inventive concept, as shown in FIG. 3, an embodiment of the present application provides a network side apparatus (for example, a base station), at least including a processor 31 and a memory 32.

The processor 31 is used for reading a program in the memory 32 and executing the following processes: configuring a first channel and/or a first signal, wherein the first channel and/or the first signal are/is used for indicating receiving and/or transmitting of a second signal of at least one terminal group corresponding to at least one terminal; and transmitting the first channel and/or the first signal to the at least one terminal.

As shown in FIG. 3, in the embodiment of the present application, a bus architecture may include any number of interconnected buses and bridges which are specifically linked together through various circuits of one or more processors represented by the processor 31, and memories represented by the memory 32. The bus architecture may also link together various other circuits of a peripheral device, a voltage regulator, a power management circuit, etc., which are well known in the art and, therefore, will not be described further herein. A bus interface provides an interface. A transceiver may include a plurality of elements, that is, the transceiver includes a transmitter and a receiver for providing units for communicating with various other apparatuses over a transmission medium. The processor 31 is used for managing the bus architecture and general processing, and the memory 32 may store data used by the processor 31 in performing operations.

Optionally, the first channel is a power saving channel, and the first signal is a power saving signal.

Optionally, the power saving signal is dynamic signaling, static signaling, or semi-static signaling.

Optionally, the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Further, the first information may also be used for implementing at least one of the following operations: indicating X quantity of radio resource management (RRM) measurements which are based on the second signal; indicating to skip Y quantity of RRM measurements which are based on the second signal; indicating an RRM measurement, which is based on the second signal, in R1 quantity of DRX cycles; Indicating an RRM measurement, which is based on the second signal, in R2 quantity of second signal cycles; indicating to skip an RRM measurement, which is based on the second signal, in S1 quantity of DRX cycles; or indicating to skip an RRM measurement, which is based on the second signal, in S2 quantity of second signal cycles.

Optionally, when transmitting the first channel and/or the first signal to the at least one terminal, the processor 31 is used for: transmitting, in a condition that the network side determines that it needs to transmit the second signal, the first channel and/or the first signal to the at least one terminal.

Optionally, the processor 31 is further used for: not transmitting, in a condition that the network side determines that it is no need to transmit the second signal, the first channel and/or the first signal to the at least one terminal.

Optionally, the at least one terminal is divided into at least one terminal group, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: Z quantity of terminal groups configured corresponding to Z quantity of bits contained in the first channel and/or the first signal, respectively, wherein one bit is used for indicating whether at least one terminal in one terminal group transmits and/or receives the second signal; F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier, or the first channel and/or the first signal contain/contains the Z quantity of bits configured as E-order bits, wherein E is a positive integer greater than 1, first-order bits are used for indicating the quantity of terminal groups for transmitting and/or receiving the second signal, and second-order bits are used for indicating the terminal group identifier. The respective quantities of bits corresponding to the respective terminal groups are the same or different. Configurations of the Z quantity of bits are continuous or incontinuous in a resource.

Optionally, the kind of terminal group based on the resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on the parameter configuration of the first channel and/or the first signal includes at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO; a kind of terminal group based on at least one search space (SS) configuration of the first channel and/or the first signal, wherein different SS configurations correspond to different terminal groups, and one SS configuration contains at least one SS; a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one kind of the following joint indications: different joint manners between the bit and the resource configuration of the first channel and/or the first signal correspond to different terminal groups, respectively; different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner; a radio resource control (RRC)-connected signaling configured manner; a media access control-control element (MAC-CE) configured manner, or a dynamic signaling configured manner.

Figure 4:
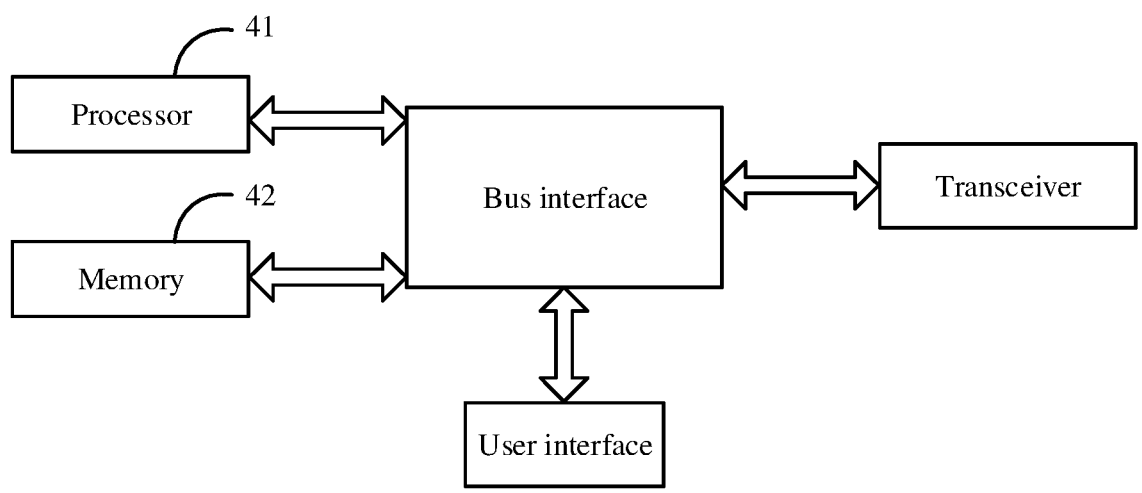
FIG. 4 is a structural schematic diagram of an entity of a terminal in an embodiment of the present application.

Based on the same inventive concept, as shown in FIG. 4, an embodiment of the present application provides a terminal, at least including a processor 41 and a memory 42, wherein the processor 41 is used for reading a program in the memory 42 and executing the following processes: receiving a first channel and/or a first signal transmitted by a network side, wherein the first channel and/or the first signal are/is used for indicating receiving and/or transmitting of a second signal of at least one terminal group corresponding to at least one terminal; and receiving, on the basis of indications/an indication of the first channel and/or the first signal, the second signal transmitted by the network side.

As shown in FIG. 4, in the embodiment of the present application, a bus architecture may include any number of interconnected buses and bridges which are specifically linked together through various circuits of one or more processors represented by the processor 41, and memories represented by the memory 42. The bus architecture may also link together various other circuits of a peripheral device, a voltage regulator, a power management circuit, etc., which are well known in the art and, therefore, will not be described further herein. A bus interface provides an interface. A transceiver may include a plurality of elements, that is, the transceiver includes a transmitter and a receiver for providing units for communicating with various other apparatuses over a transmission medium. For different user equipment, a user interface may also be an interface that enables external and internal connection to desired devices, including, but not limited to, a keypad, a display, a speaker, a microphone, a joystick, etc.

The processor 41 is used for managing the bus architecture and general processing, and the memory 42 may store data used by the processor 41 in performing operations.

Optionally, the first channel is a power saving channel, and the first signal is a power saving signal.

Optionally, the power saving signal is dynamic signaling, static signaling, or semi-static signaling.

Optionally, the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Further, the first information may also be used for implementing at least one of the following operations: indicating X quantity of radio resource management (RRM) measurements which are based on the second signal; indicating to skip Y quantity of RRM measurements which are based on the second signal; indicating an RRM measurement, which is based on the second signal, in R1 quantity of DRX cycles; Indicating an RRM measurement, which is based on the second signal, in R2 quantity of second signal cycles; indicating to skip an RRM measurement, which is based on the second signal, in S1 quantity of DRX cycles; or indicating to skip an RRM measurement, which is based on the second signal, in S2 quantity of second signal cycles.

Optionally, the processor 41 is further used for: not receiving, if the first channel and/or the first signal transmitted by the network side are/is not received, the second signal transmitted by the network side.

Optionally, the at least one terminal is divided into at least one terminal group, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: Z quantity of terminal groups configured corresponding to Z quantity of bits contained in the first channel and/or the first signal, respectively, wherein one bit is used for indicating whether at least one terminal in one terminal group transmits and/or receives the second signal; F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier, or the first channel and/or the first signal contain/contains the Z quantity of bits configured as E-order bits, wherein E is a positive integer greater than 1, first-order bits are used for indicating the quantity of terminal groups for transmitting and/or receiving the second signal, and second-order bits are used for indicating a terminal group identifier. The respective quantities of bits corresponding to the respective terminal groups are the same or different. Configurations of the Z quantity of bits are continuous or incontinuous in a resource.

Optionally, the kind of terminal group based on the resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on the parameter configuration of the first channel and/or the first signal includes at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO: a kind of terminal group based on at least one search space (SS) configuration of the first channel and/or the first signal, wherein different SS configurations correspond to different terminal groups, and one SS configuration contains at least one SS: a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one kind of the following joint indications: different joint manners between the bit and the resource configuration of the first channel and/or the first signal correspond to different terminal groups, respectively: different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner; a radio resource control (RRC)-connected signaling configured manner; a media access control-control element (MAC-CE) configured manner, or a dynamic signaling configured manner.

Figure 5:
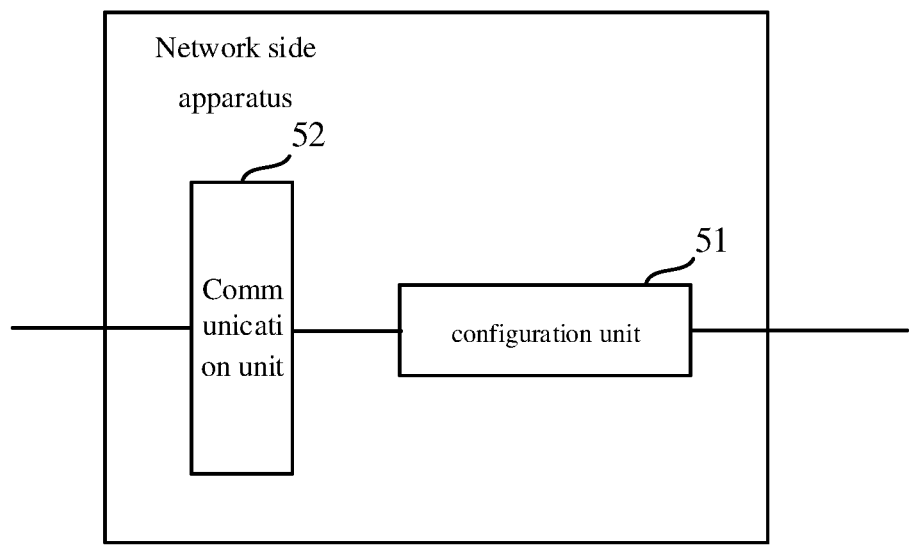
FIG. 5 is a structural schematic diagram of logic of a network side apparatus in an embodiment of the present application.

Based on the same inventive concept, as shown in FIG. 5, an embodiment of the present application provides a network side apparatus (for example, a base station), at least including a configuration unit 51 and a communication unit 52, wherein the configuration unit 51 is used for configuring a first channel and/or a first signal, wherein the first channel and/or the first signal are/is used for indicating receiving and/transmitting of a second signal of at least one terminal group corresponding to at least one terminal; and the communication unit 52 is used for transmitting the first channel and/or the first signal to the at least one terminal.

Optionally, the first channel is a power saving channel, and the first signal is a power saving signal.

Optionally, the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Optionally, the transmitting, by the communication unit, the first channel and/or the first signal to the at least one terminal includes: transmitting, in a condition that the network side determines that it needs to transmit the second signal, the first channel and/or the first signal to the at least one terminal.

Optionally, in a condition that the network side determines that it is no need to transmit the second signal, the communication unit does not transmit the first channel and/or the first signal to the at least one terminal.

Optionally, the at least one terminal is divided into at least one terminal group, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: Z quantity of terminal groups configured corresponding to Z quantity of bits contained in the first channel and/or the first signal, respectively, wherein one bit is used for indicating whether at least one terminal in one terminal group transmits and/or receives the second signal; F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier, or the first channel and/or the first signal contain/contains the Z quantity of bits configured as E-order bits, wherein E is a positive integer greater than 1, first-order bits are used for indicating the quantity of terminal groups for transmitting and/or receiving the second signal, and second-order bits are used for indicating a terminal group identifier. The respective quantities of bits corresponding to the respective terminal groups are the same or different.

Configurations of the Z quantity of bits are continuous or incontinuous in a resource.

Optionally, the kind of terminal group based on the resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on the parameter configuration of the first channel and/or the first signal includes at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO; a kind of terminal group based on at least one search space (SS) configuration of the first channel and/or the first signal, wherein different SS configurations correspond to different terminal groups, and one SS configuration contains at least one SS: a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one kind of the following joint indications: different joint manners between the bit and the resource configuration of the first channel and/or the first signal correspond to different terminal groups, respectively: different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner, a radio resource control (RRC)-connected signaling configured manner; a media access control-control element (MAC-CE) configured manner, or a dynamic signaling configured manner.

Further, in the embodiment of the present application, the configuration unit 51 matches the communication unit 52, to implement various processes executed by the network side in each embodiment described above.

Figure 6:
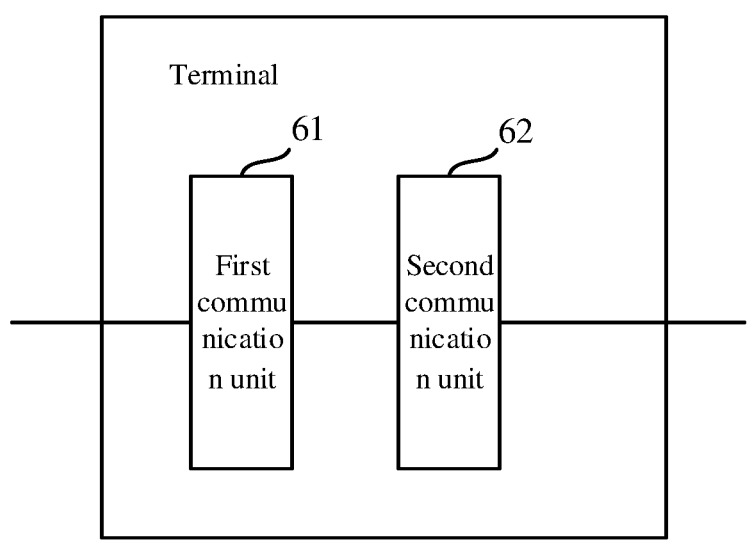
FIG. 6 is a structural schematic diagram of logic of a terminal in an embodiment of the present application.

Based on the same inventive concept, as shown in FIG. 6, an embodiment of the present application provides a terminal, at least including a first communication unit 61 and a second communication unit 62, wherein the first communication unit 61 is used for receiving a first channel and/or a first signal transmitted by a network side, wherein the first channel and/or the first signal are/is used for indicating receiving and/or transmitting of a second signal of at least one terminal group corresponding to at least one terminal; and the second communication unit 62 is used for receiving, on the basis of indications/an indication of the first channel and/or the first signal, the second signal transmitted by the network side.

Optionally, the first channel is a power saving channel, and the first signal is a power saving signal.

Optionally, the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

Optionally, the first channel and/or the first signal carry/carries first information, and the first information is used for indicating receiving and/or transmitting of the second signal of the at least one terminal and is used for implementing at least one of the following operations: indicating receiving and/or transmitting of N quantity of second signals; indicating receiving and/or transmitting of the second signal in M1 quantity of discontinuous reception (DRX) cycles; indicating receiving and/or transmitting of the second signal in M2 quantity of second signal cycles; indicating to skip receiving and/or transmitting of K quantity of second signals; indicating to skip receiving and/or transmitting of the second signal in L1 quantity of DRX cycles; indicating to skip receiving and/or transmitting of the second signal in L2 quantity of second signal cycles; indicating receiving and/or transmitting of the second signal with a probability P; or indicating to skip receiving and/or transmitting of the second signal with a probability Q or (1−P).

Optionally, the second communication unit is further used for: not receiving, in a condition that the terminal does not receive the first channel and/or the first signal transmitted by the network side, the second signal transmitted by the network side.

Optionally, the at least one terminal is divided into at least one terminal group, and the at least one terminal group includes at least one kind of terminal group or at least two kinds of terminal groups indicated jointly of the following: a kind of terminal group based on a bit of the first channel and/or the first signal; a kind of terminal group based on a resource configuration of the first channel and/or the first signal; or a kind of terminal group based on a parameter configuration of the first channel and/or the first signal.

Optionally, the terminal groups based on bits of the first channel and/or the first signal include at least one of the following: Z quantity of terminal groups configured corresponding to Z quantity of bits contained in the first channel and/or the first signal, respectively, wherein one bit is used for indicating whether at least one terminal in one terminal group transmits and/or receives the second signal; F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier, or the first channel and/or the first signal contain/contains the Z quantity of bits configured as E-order bits, wherein E is a positive integer greater than 1, first-order bits are used for indicating the quantity of terminal groups for transmitting and/or receiving the second signal, and second-order bits are used for indicating a terminal group identifier. The respective quantities of bits corresponding to the respective terminal groups are the same or different. Configurations of the Z quantity of bits are continuous or incontinuous in a resource.

Optionally, the kind of terminal group based on the resource configuration of the first channel and/or the first signal includes at least one kind of the following: a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit; a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

Optionally, the kind of terminal group based on the parameter configuration of the first channel and/or the first signal includes at least one kind of the following: a kind of terminal group based on at least one core resource set (CORESET) configuration of the first channel and/or the first signal, wherein different CORESET configurations correspond to different terminal groups, and one CORESET configuration contains at least one CORESET; a kind of terminal group based on at least one monitoring occasion (MO) configuration of the first channel and/or the first signal, wherein different MO configurations correspond to different terminal groups, and one MO configuration contains at least one MO; a kind of terminal group based on at least one search space (SS) configuration of the first channel and/or the first signal, wherein different SS configurations correspond to different terminal groups, and one SS configuration contains at least one SS; a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

Optionally, the at least one terminal group is configured by using at least one kind of the following joint indications: different joint manners between the bit and the resource configuration of the first channel and/or the first signal correspond to different terminal groups, respectively; different joint manners between the bit and the parameter configuration of the first channel and/or the first signal correspond to different terminal groups, respectively; different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

Optionally, the terminal group is configured in at least one of the following manners: a predefined manner; a high-layer signaling configured manner; a radio resource control (RRC)-connected signaling configured manner; a media access control-control element (MAC-CE) configured manner, or a dynamic signaling configured manner.

Further, in the embodiment of the present application, the first communication unit 61 matches the second communication unit 62, to implement various processes executed by the terminal in each embodiment described above.

Based on the same inventive concept, an embodiment of the present application provides a storage medium. When an instruction in the storage medium is executed by a processor, the instruction causes the processor to execute any method implemented by a network side in each embodiment described above.

Based on the same inventive concept, an embodiment of the present application provides a storage medium. When an instruction in the storage medium is executed by a processor, the instruction causes the processor to execute any method implemented by a terminal in each embodiment described above.

In conclusion, in the embodiments of the present application, the network side configures the first channel and/or the first signal, wherein the first channel and/or the first signal are/is used for indicating receiving and/or transmitting of the second signal of at least one terminal group corresponding to at least one terminal, and the network side transmits the first channel and/or the first signal to the at least one terminal. The terminal receives, on the basis of a manner indicated by the network side, the second signal transmitted by the network side, such that when the terminal is in the RRC-idle state or the RRC-inactive state, the network side may reduce, in the manner described above, the quantity of times that various types of messages are received by the terminal side, thereby effectively reducing power consumption of the terminal, and preventing the terminal from being given an unnecessary operation load.

Further, when the terminal side receives, in a terminal group manner, the second signal, by using the technical solutions described above, the network side may indicate, on the basis of sizes of the terminal groups, reducing of the quantity of times that various type of messages are received by each of the terminal groups in different degrees, respectively, thereby reducing the power consumption of all the terminals in each of the terminal groups to a great extent, and preventing the terminals from being given the unnecessary operation load.

Those skilled in the art should understand that the embodiments of the present application may be provided as methods, systems, or computer program products. Therefore, the present application may use full hardware embodiments, full software embodiments, or software and hardware combination embodiments. Moreover, the present application may take the form of a computer program product implemented on one or more computer usable storage media (including, but not limited to, disk memories, CD-ROMs, optical memories, etc.) containing computer usable program codes.

The present application is described with reference to flowcharts and/or block diagrams of methods, devices (systems), and computer program products according to the embodiments of the present application. It should be understood that each flow and/or block in the flowcharts and/or the block diagrams and a combination of the flow and/or the block in the flowcharts and/or the block diagrams may be implemented through computer program instructions. These computer program instructions may be provided for a processor of a general-purpose computer, a special-purpose computer, an embedded processor, or other programmable data processing devices to produce a machine, such that instructions executed by the processor of the computer or other programmable data processing devices produce an apparatus used for implementing functions specified in one or more flows of the flowcharts and/or one or more blocks of the block diagrams.

These computer program instructions may also be stored in a computer readable memory that may guide a computer or other programmable data processing devices to work in a specific manner, such that the instructions stored in the computer readable memory produce an article of manufacture including an instruction device, and the instruction device implements the functions specified in one or more flows of the flowcharts and/or one or more blocks of the block diagrams.

These computer program instructions may also be loaded onto the computer or other programmable data processing devices, such that a series of operation steps are executed on the computer or other programmable devices to generate computer-implemented processing, and instructions executed on the computer or other programmable devices provide steps for implementing the functions specified in one or more flows of the flowcharts and/or one or more blocks of the block diagrams.

Although the preferred embodiments of the present application have been described, those skilled in the art may make additional changes and modifications to these embodiments once they learn the basic inventive concepts. Therefore, the appended claims are intended to be interpreted as encompassing the preferred embodiments and all changes and modifications falling within the scope of the present application.

Apparently, those skilled in the art may make various modifications and variations to the embodiments of the present application without departing from the spirit and scope of the embodiments of the present application. In this way, if these modifications and variations in the embodiments of the present application fall within the scope of the claims of the present application and their equivalents, the present application is also intended to encompass these modifications and variations.

What is claimed is:

1. A channel and/or signal transceiving method, comprising:

configuring, by a network side, a first channel and/or a first signal, wherein the first channel and/or the first signal are/is used for indicating receiving and/or transmitting of a second signal of at least one terminal group corresponding to at least one terminal; and transmitting, by the network side, the first channel and/or the first signal to the at least one terminal;

wherein the at least one terminal is divided into at least one terminal group, and the at least one terminal group comprises at least one kind of terminal group or at least two kinds of terminal groups indicated jointly of the following:
a kind of terminal group based on a bit of the first channel and/or the first signal;
a kind of terminal group based on a resource configuration of the first channel and/or the first signal; or
a kind of terminal group based on a parameter configuration of the first channel and/or the first signal.

2. The method according to claim 1, wherein the first channel is a power saving channel, and the first signal is a power saving signal; and/or
the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

3. The method according to claim 1, wherein the first channel and/or the first signal carry/carries first information, and the first information is used for indicating receiving and/or transmitting of the second signal of the at least one terminal and is used for implementing at least one of the following operations:
indicating receiving and/or transmitting of N quantity of second signals;
indicating receiving and/or transmitting of the second signal in M1 quantity of discontinuous reception (DRX) cycles;
indicating receiving and/or transmitting of the second signal in M2 quantity of second signal cycles;
indicating to skip receiving and/or transmitting of K quantity of second signals;
indicating to skip receiving and/or transmitting of the second signal in L1 quantity of DRX cycles;
indicating to skip receiving and/or transmitting of the second signal in L2 quantity of second signal cycles;
indicating receiving and/or transmitting of the second signal with a probability P; or
indicating to skip receiving and/or transmitting of the second signal with a probability Q or (1-P).

4. The method according to claim 1, wherein the transmitting, by the network side, the first channel and/or the first signal to the at least one terminal comprises:
transmitting, by the network side, in a condition that the network side determines that it needs to transmit the second signal, the first channel and/or the first signal to the at least one terminal.

5. The method according to claim 4, wherein in a condition that the network side determines that it is no need to transmit the second signal, the network side does not transmit the first channel and/or the first signal to the at least one terminal.

6. The method according to claim 1, wherein the kind of terminal group based on the bit of the first channel and/or the first signal comprises at least one kind of the following:
Z quantity of terminal groups configured corresponding to Z quantity of bits contained in the first channel and/or the first signal, respectively, wherein one bit is used for indicating whether at least one terminal in one terminal group transmits and/or receives the second signal;
F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier; or
the first channel and/or the first signal contain/contains the Z quantity of bits configured as E-order bits, wherein E is a positive integer greater than 1, first-order bits are used for indicating the quantity of terminal groups for transmitting and/or receiving the second signal, second-order bits are used for indicating a terminal group identifier, and the respective quantities of bits corresponding to the respective terminal groups are the same or different;
wherein configurations of the Z quantity of bits are continuous or incontinuous in a resource.

7. The method according to claim 1, wherein the kind of terminal group based on the resource configuration of the first channel and/or the first signal comprises at least one kind of the following:
a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit;
a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or
a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

8. The method according to claim 1, wherein the kind of terminal group based on the parameter configuration of the first channel and/or the first signal comprises at least one kind of the following:
a kind of terminal group based on at least one core resource set (CORESET) configuration of the first channel and/or the first signal, wherein different CORESET configurations correspond to different terminal groups, and one CORESET configuration contains at least one CORESET;
a kind of terminal group based on at least one monitoring occasion (MO) configuration of the first channel and/or the first signal, wherein different MO configurations correspond to different terminal groups, and one MO configuration contains at least one MO;

a kind of terminal group based on at least one search space (SS) configuration of the first channel and/or the first signal, wherein different SS configurations correspond to different terminal groups, and one SS configuration contains at least one SS;

a kind of terminal group based on at least one SS candidate configuration of the first channel and/or the first signal, wherein different SS candidate configurations correspond to different terminal groups, and one SS candidate configuration contains at least one SS candidate; or a kind of terminal group based on at least one hash function starting position configuration of the first channel and/or the first signal, wherein different hash function starting position configurations correspond to different terminal groups, and one hash function starting position configuration contains at least one hash function starting position.

9. The method according to claim 7, wherein the at least one terminal group is configured by using at least one kind of the following joint indications:

different joint manners between the bit and the resource configuration of the first channel and/or the first signal correspond to different terminal groups, respectively;

different joint manners between the bit and the parameter configuration of the first channel and/or the first signal correspond to different terminal groups, respectively;

different joint manners between the resource configuration and the parameter configuration of the first channel and/or the first signal correspond to different terminal groups, respectively; or different joint manners among the bit, the resource configuration, and the parameter configuration of the first channel and/or the first signal correspond to different terminal groups, respectively.

10. The method according to claim 1, wherein the terminal group is configured in at least one of the following manners:

a predefined manner;

a high-layer signaling configured manner;

a radio resource control (RRC)-connected signaling configured manner;

a media access control-control element (MAC-CE) configured manner; or a dynamic signaling configured manner.

11. A channel and/or signal transceiving method, comprising:

receiving, by a terminal, a first channel and/or a first signal transmitted by a network side, wherein the first channel and/or the first signal are/is used for indicating receiving and/or transmitting of a second signal of at least one terminal group corresponding to at least one terminal; and receiving, by the terminal on the basis of indications/an indication of the first channel and/or the first signal, the second signal transmitted by the network side;

wherein the at least one terminal is divided into at least one terminal group, and the at least one terminal group comprises at least one kind of terminal group or at least two kinds of terminal groups indicated jointly of the following:

a kind of terminal group based on a bit of the first channel and/or the first signal;

a kind of terminal group based on a resource configuration of the first channel and/or the first signal; or a kind of terminal group based on a parameter configuration of the first channel and/or the first signal.

12. The method according to claim 11, wherein the first channel is a power saving channel, and the first signal is a power saving signal; and/or the second signal is at least one of the following signals: a paging signal, a synchronization signal block (SSB), a channel state indicator-reference signal (CSI-RS), a tracking reference signal (TRS), a phase tracking reference signal (PT-RS), a positioning reference signal (P-RS), or a sounding reference signal (SRS).

13. The method according to claim 11, wherein the first channel and/or the first signal carry/carries first information, and the first information is used for indicating receiving and/or transmitting of the second signal of the at least one terminal and is used for implementing at least one of the following operations:

indicating receiving and/or transmitting of N quantity of second signals;

indicating receiving and/or transmitting of the second signal in M1 quantity of discontinuous reception (DRX) cycles;

indicating receiving and/or transmitting of the second signal in M2 quantity of second signal cycles;

indicating to skip receiving and/or transmitting of K quantity of second signals;

indicating to skip receiving and/or transmitting of the second signal in L1 quantity of DRX cycles;

indicating to skip receiving and/or transmitting of the second signal in L2 quantity of second signal cycles;

indicating receiving and/or transmitting of the second signal with a probability P; or indicating to skip receiving and/or transmitting of the second signal with a probability Q or (1-P).

14. The method according to claim 11, further comprising: in a condition that the terminal does not receive the first channel and/or the first signal transmitted by the network side, the terminal does not receive the second signal transmitted by the network side.

15. The method according to claim 11, wherein the kind of terminal groups based on the bits of the first channel and/or the first signal comprises at least one kind of the following:

Z quantity of terminal groups configured corresponding to Z quantity of bits contained in the first channel and/or the first signal, respectively, wherein one bit is used for indicating whether at least one terminal in one terminal group transmits and/or receives the second signal;

F quantity of terminal groups configured corresponding to Z quantity of bits contained in the first channel and/or the first signal, respectively, wherein F is a positive integer not greater than the Z, and a bit corresponding to each of the terminal groups carries at least one kind of the following information: whether to transmit and/or receive the second signal, or a terminal group identifier; or the first channel and/or the first signal contain/contains the Z quantity of bits configured as E-order bits, wherein E is a positive integer greater than 1, first-order bits are used for indicating the quantity of terminal groups for transmitting and/or receiving the second signal, second-order bits are used for indicating a terminal group identifier, and the respective quantities of bits corresponding to the respective terminal groups are the same or different;

wherein configurations of the Z quantity of bits are continuous or incontinuous in a resource.

16. The method according to claim 11, wherein the kind of terminal group based on the resource configuration of the first channel and/or the first signal comprises at least one kind of the following:
- a kind of terminal group based on at least one time domain resource configuration of the first channel and/or the first signal, wherein the time domain resource configuration comprises at least one of time domain units each of which is at least one of a radio frame, a half frame, a sub-frame, a slot, or a symbol, different time domain resource configurations correspond to different terminal groups, the at least one time domain resource configuration is continuous or incontinuous in a time domain, and one time domain resource configuration comprises a time domain resource of at least one time domain unit;
- a kind of terminal group based on at least one frequency domain resource configuration of the first channel and/or the first signal, wherein the frequency domain resource configuration comprises at least one of frequency domain units each of which is a carrier wave, a bandwidth part, a resource block, or a resource unit, different frequency domain resource configurations correspond to different terminal groups, the frequency domain resource configurations are continuous or incontinuous in a frequency domain, and one frequency domain resource configuration comprises a frequency domain resource of at least one frequency domain unit; or
- a kind of terminal group based on at least one spatial domain resource configuration of the first channel and/or the first signal, wherein the spatial domain resource configuration comprises at least one of a beam direction, an antenna, or a spatial layer, different spatial domain resource configurations correspond to different terminal groups, the spatial domain resource configurations are continuous or incontinuous in a spatial domain, and one spatial domain resource configuration comprises a spatial domain resource of at least one spatial domain unit.

17. The method according to claim 11, wherein the kind of terminal group based on the parameter configuration of the first channel and/or the first signal comprises at least one kind of the following:
- a kind of terminal group based on at least one core resource set (CORESET) configuration of the first channel and/or the first signal, wherein different CORESET configurations correspond to different terminal groups, and one CORESET configuration contains at least one CORESET;
- a kind of terminal group based on at least one monitoring occasion (MO) configuration of the first channel and/or the first signal, wherein different MO configurations correspond to different terminal groups, and one MO configuration contains at least one MO;
- a kind of terminal group based on at least one search space (SS) configuration of the first channel and/or the first signal, wherein different SS configurations correspond to different terminal groups, and one SS configuration contains at least one SS;
- a kind of terminal group based on at least one SS candidate configuration of the first channel and/or the first signal, wherein different SS candidate configurations correspond to different terminal groups, and one SS candidate configuration contains at least one SS candidate; or
- a kind of terminal group based on at least one hash function starting position configuration of the first channel and/or the first signal, wherein different hash function starting position configurations correspond to different terminal groups, and one hash function starting position configuration contains at least one hash function starting position.

18. The method according to claim 11, wherein the at least one terminal group is configured by using at least one kind of the following joint indications:
- different joint manners between the bit and the resource configuration of the first channel and/or the first signal correspond to different terminal groups, respectively;
- different joint manners between the bit and the parameter configuration of the first channel and/or the first signal correspond to different terminal groups, respectively;
- different joint manners between the resource configuration and the parameter configuration of the first channel and/or the first signal correspond to different terminal groups, respectively; or
- different joint manners among the bit, the resource configuration, and the parameter configuration of the first channel and/or the first signal correspond to different terminal groups, respectively.

19. The method according to claim 11, wherein the terminal group is configured in at least one of the following manners:
- a predefined manner;
- a high-layer signaling configured manner;
- a radio resource control (RRC)-connected signaling configured manner;
- a media access control-control element (MAC-CE) configured manner; or
- a dynamic signaling configured manner.

20. A network side apparatus, at least comprising a processor and a memory, wherein
- the processor is configured for reading a program in the memory and executing the following processes:
- configuring a first channel and/or a first signal, wherein the first channel and/or the first signal are/is used for indicating receiving and/or transmitting of a second signal of at least one terminal group corresponding to at least one terminal; and
- transmitting the first channel and/or the first signal to the at least one terminal;
- wherein the at least one terminal is divided into at least one terminal group, and the at least one terminal group comprises at least one kind of terminal group or at least two kinds of terminal groups indicated jointly of the following:
- a kind of terminal group based on a bit of the first channel and/or the first signal;
- a kind of terminal group based on a resource configuration of the first channel and/or the first signal; or
- a kind of terminal group based on a parameter configuration of the first channel and/or the first signal.

* * * * *